E. E. FLORA & R. J. ZORGE.
RAILWAY SIGNAL AND TRAIN CONTROLLING MECHANISM.
APPLICATION FILED MAY 13, 1908.

912,662.

Patented Feb. 16, 1909.
8 SHEETS—SHEET 1.

E. E. FLORA & R. J. ZORGE.
RAILWAY SIGNAL AND TRAIN CONTROLLING MECHANISM.
APPLICATION FILED MAY 13, 1908.

912,662.

Patented Feb. 16, 1909.
8 SHEETS—SHEET 4.

Witnesses:
John Enders
Chas H. Buell

Inventors
Ellsworth E. Flora.
and Robert J. Zorge.
By Dyrenforth, Lee, Chritton & Wiles
Attys.

E. E. FLORA & R. J. ZORGE.
RAILWAY SIGNAL AND TRAIN CONTROLLING MECHANISM.
APPLICATION FILED MAY 13, 1908.
912,662.
Patented Feb. 16, 1909.
8 SHEETS—SHEET 6.
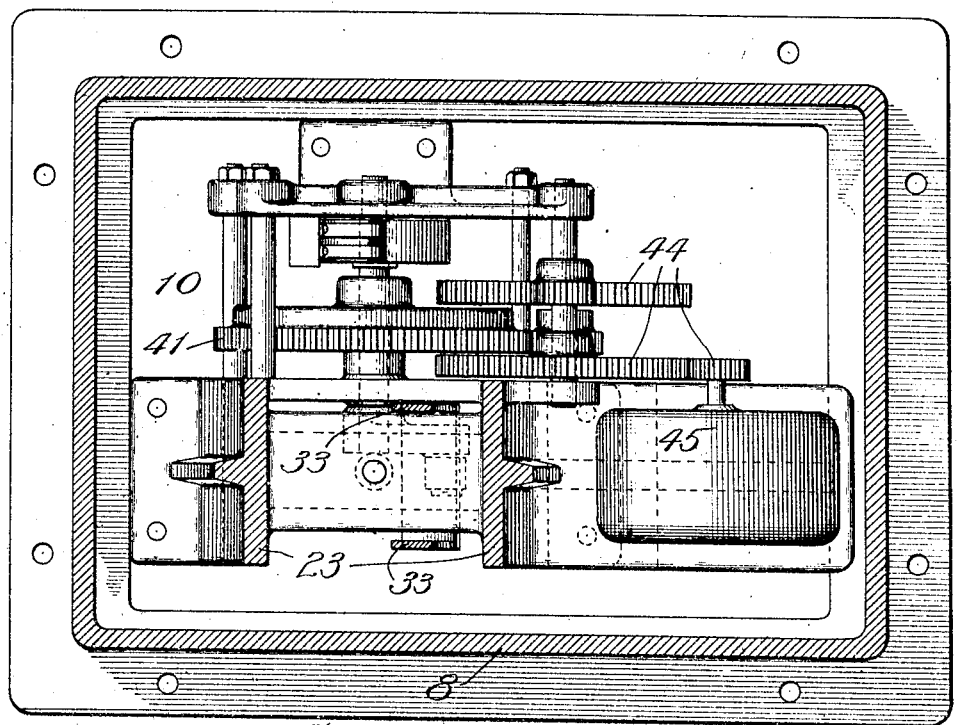
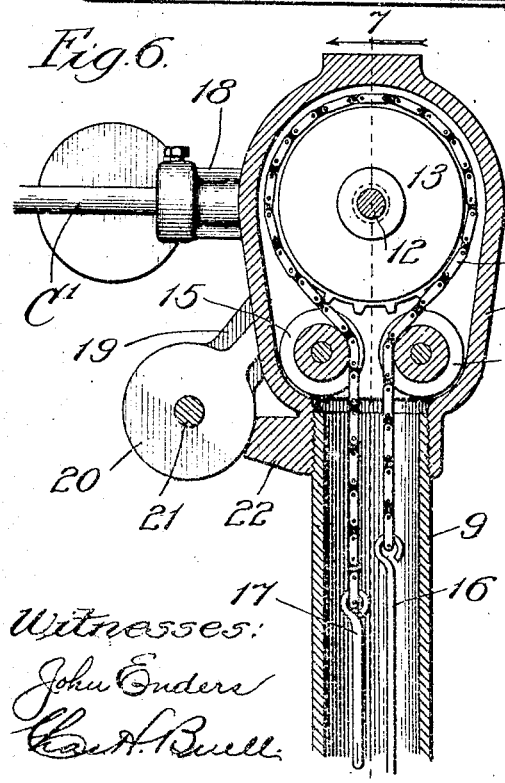
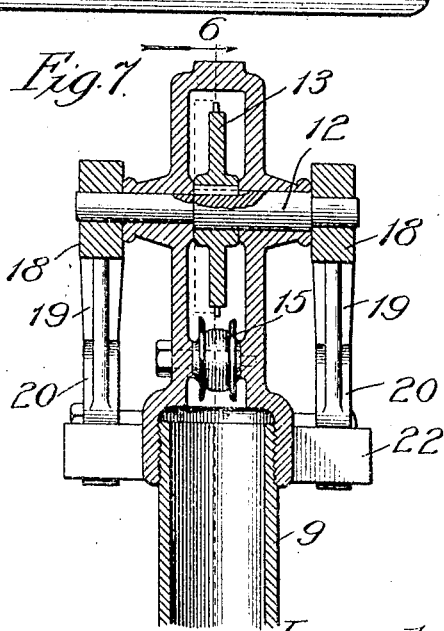
Witnesses:
John Enders
C. H. Buell
Inventors.
Ellsworth E. Flora.
and Robert J. Zorge.
By Dyrenforth, Lee, Chritton & Wiles
Attys.

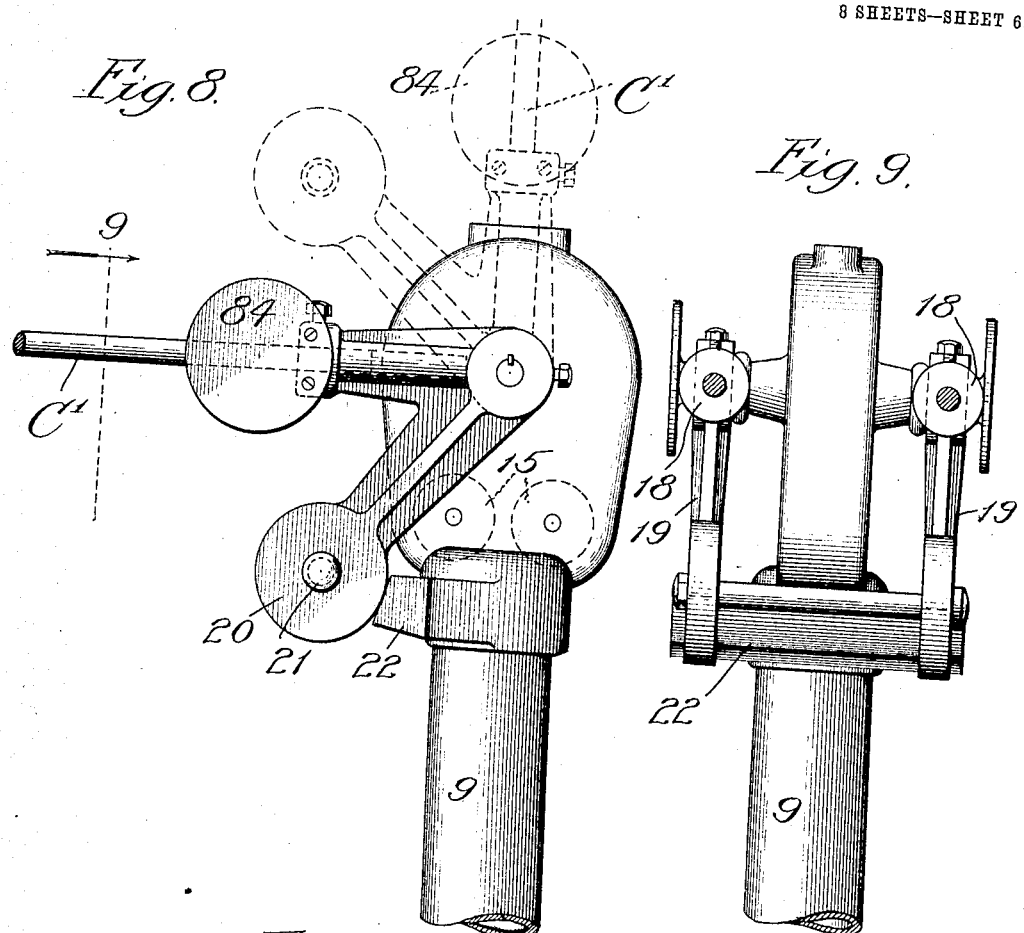

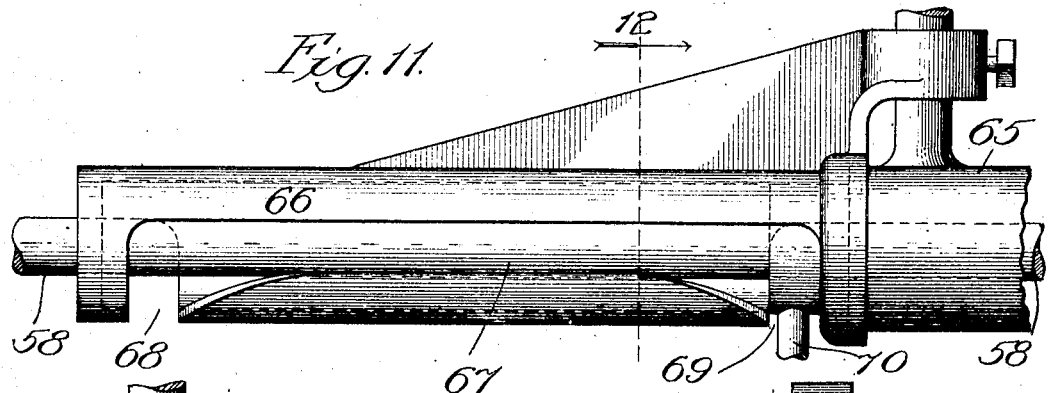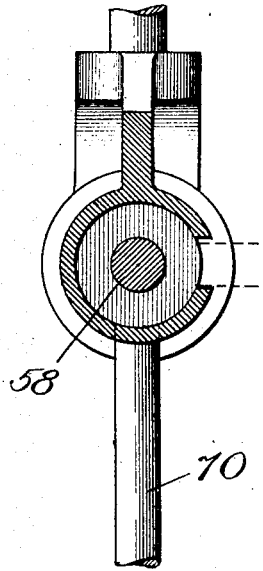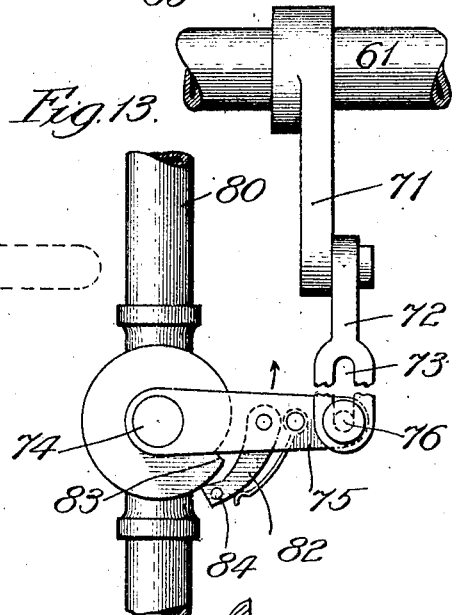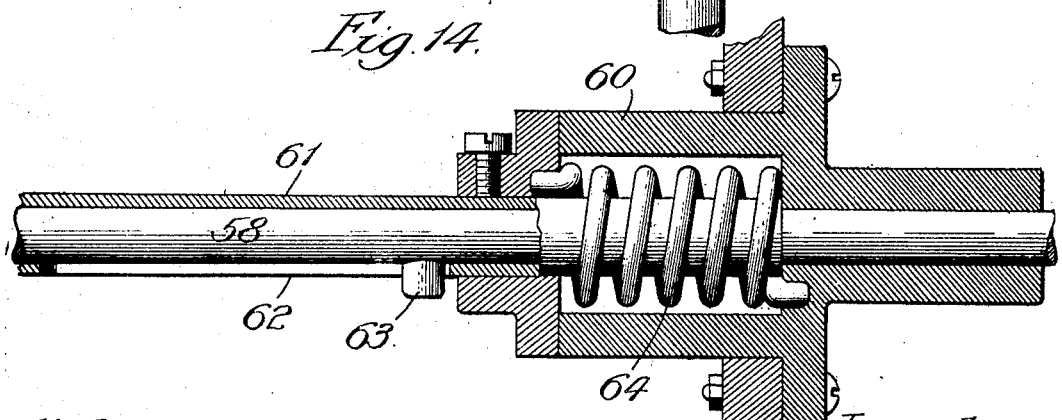

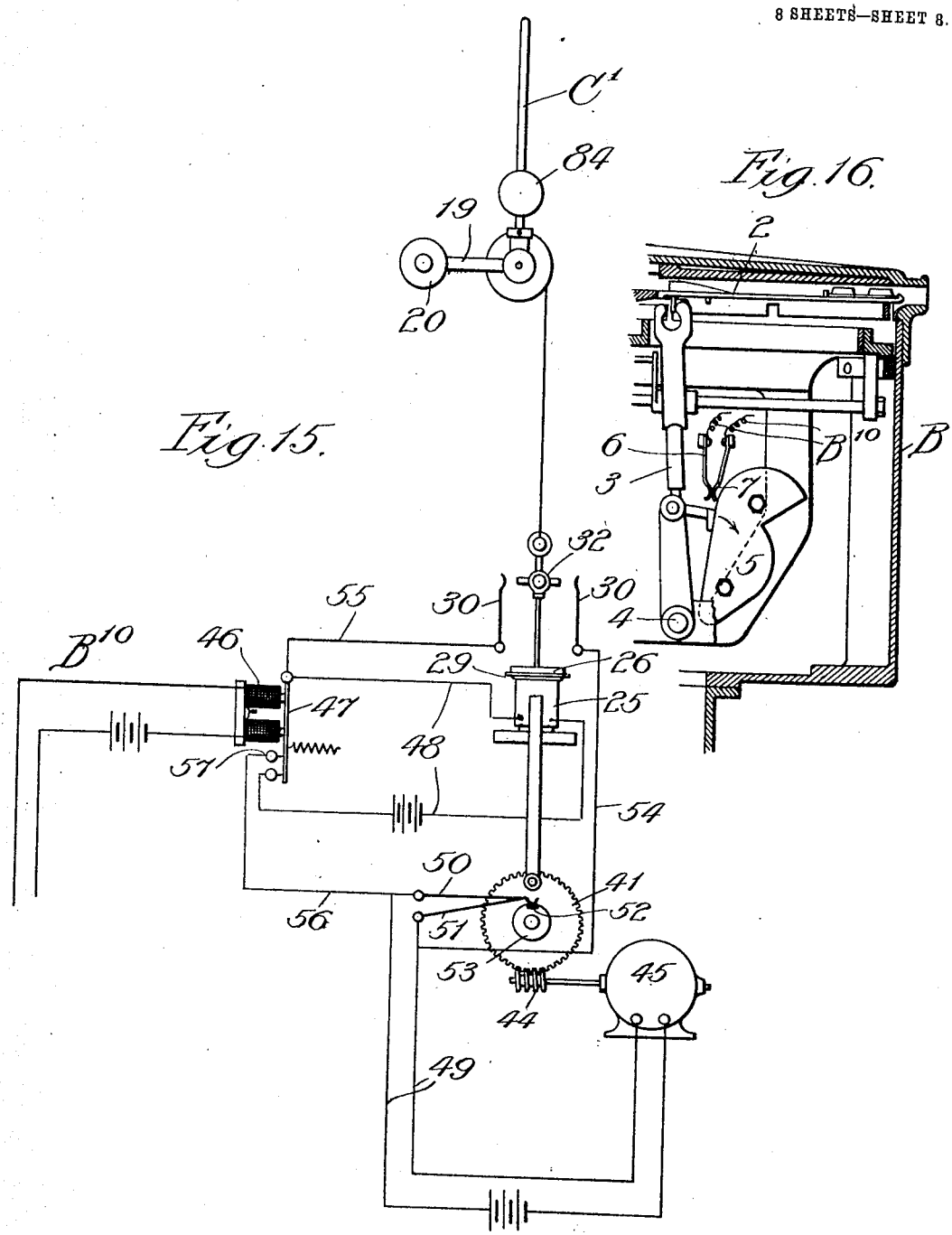

UNITED STATES PATENT OFFICE.

ELLSWORTH E. FLORA AND ROBERT J. ZORGE, OF CHICAGO, ILLINOIS, ASSIGNORS TO ZORGE SAFETY RAILWAY EQUIPMENT COMPANY, OF CHICAGO, ILLINOIS, A CORPORATION OF ILLINOIS.

RAILWAY SIGNAL AND TRAIN-CONTROLLING MECHANISM.

No. 912,662. Specification of Letters Patent. Patented Feb. 16, 1909.

Application filed May 13, 1908. Serial No. 432,730.

*To all whom it may concern:*

Be it known that we, ELLSWORTH E. FLORA and ROBERT J. ZORGE, citizens of the United States, residing at Chicago, in the county of Cook and State of Illinois, have invented a new and useful Improvement in Railway Signal and Train-Controlling Mechanism, of which the following is a specification.

This invention relates particularly to means for giving warning to an engineer, or motorman, approaching an open switch, an open draw, or other danger point with his train, or car, and to means for automatically applying the brakes if the warning is not heeded.

The primary object of the invention is to provide improved apparatus for stopping a train, in the event that the alarm signal employed is not heeded; and a further object is to provide, in combination with such mechanism, means for giving an alarm signal prior to the operation of the automatic train-controlling mechanism, in order that the engineer, if he heeds the signal, may bring his train to a stop gradually under his full control.

Some of the mechanism employed as a part of the present invention and certain of the electric circuits shown in the accompanying drawings are illustrated and described in detail in our application No. 379,791, filed June 19, 1907.

The present invention is illustrated in the accompanying drawings, in which—

Figure 1:
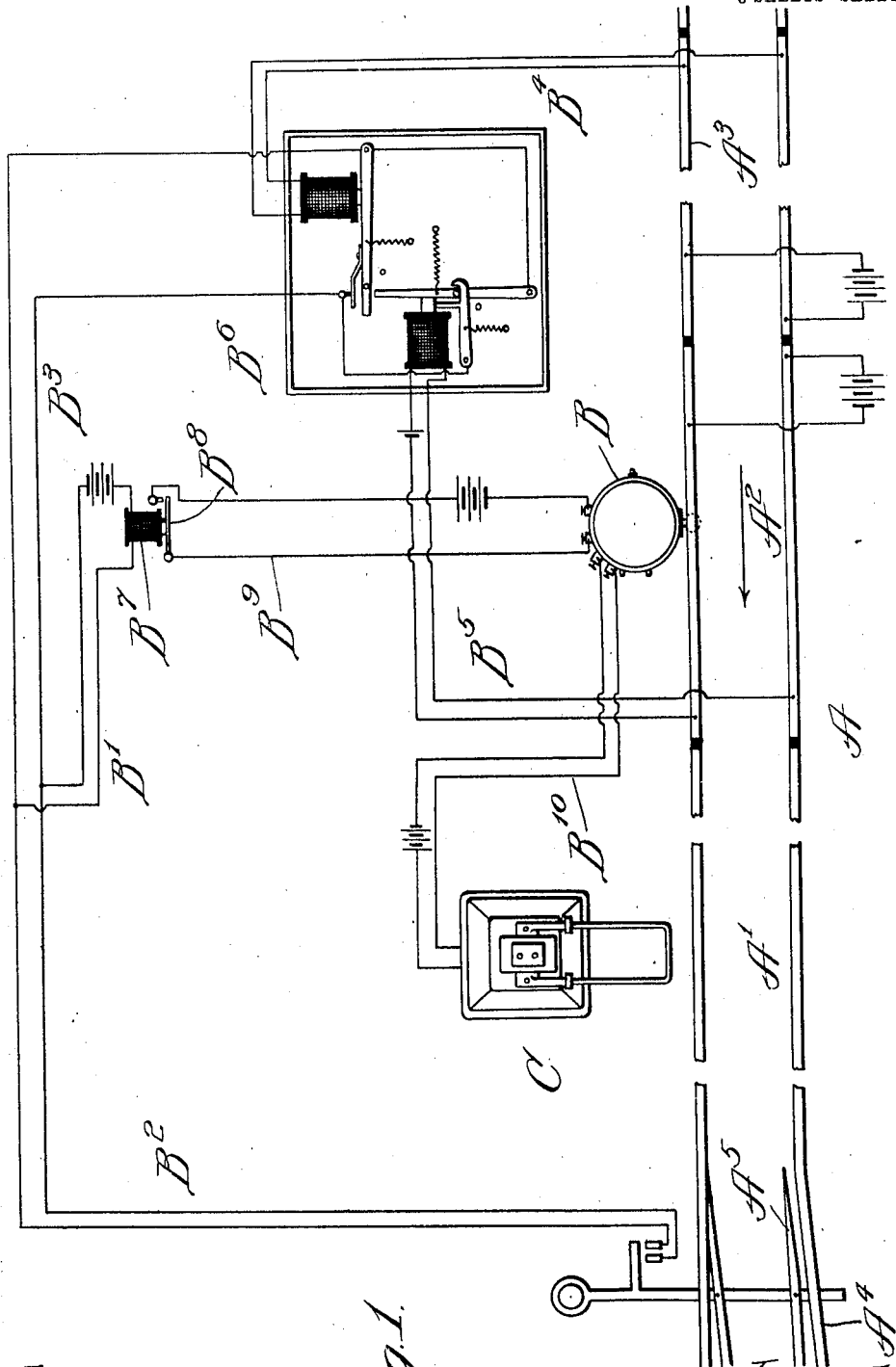
Figure 2:
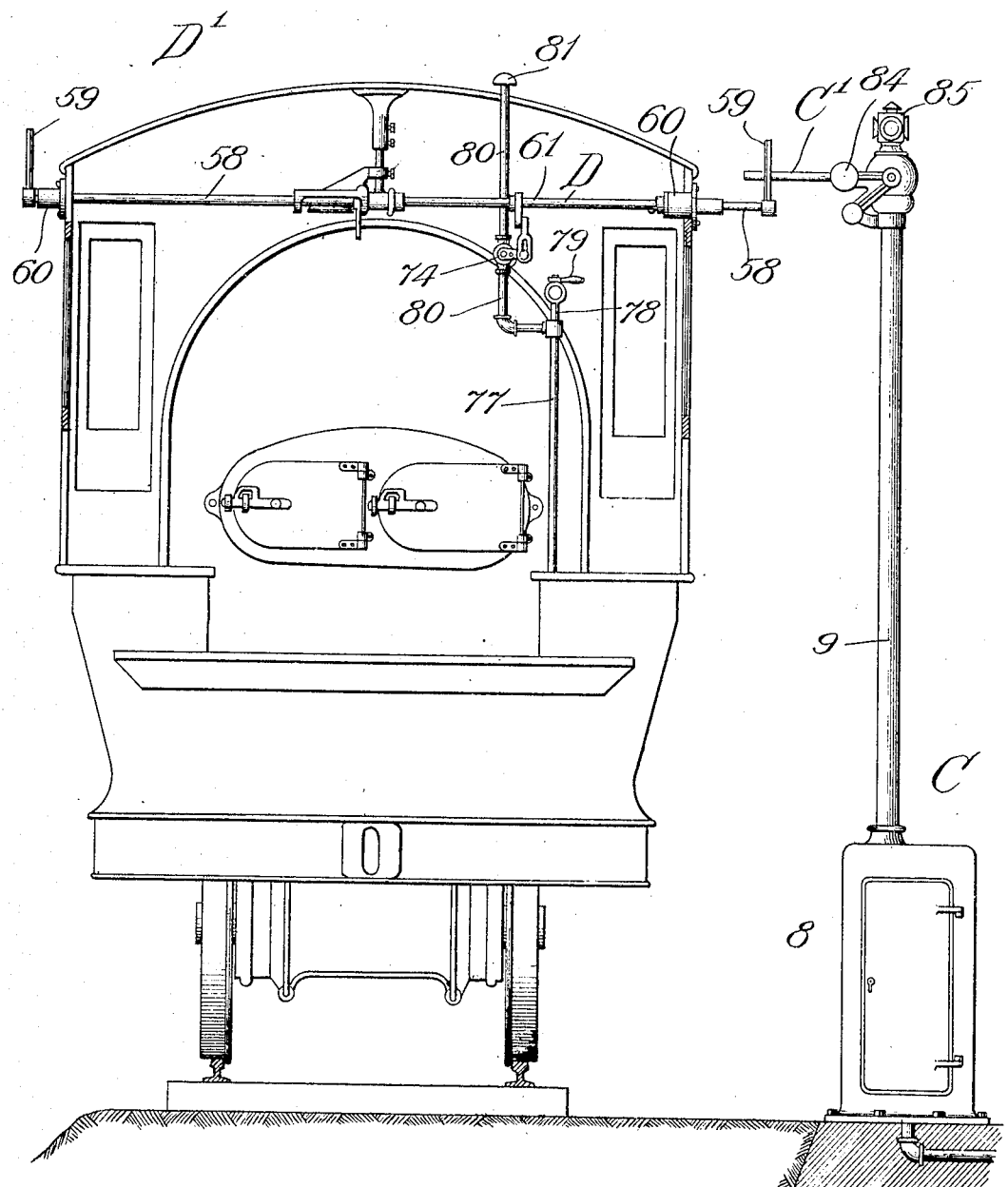
Figure 3:
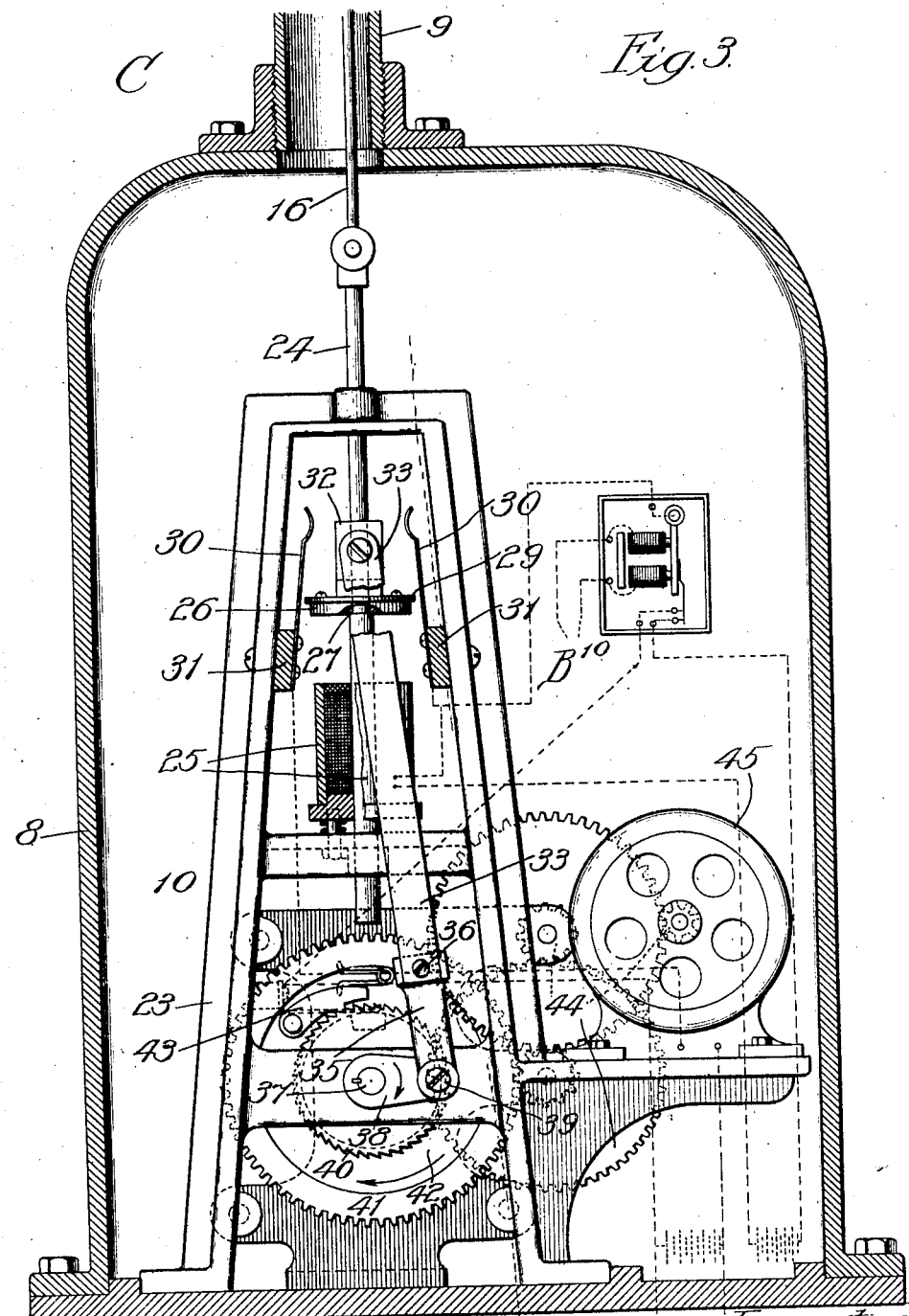
Figure 4:
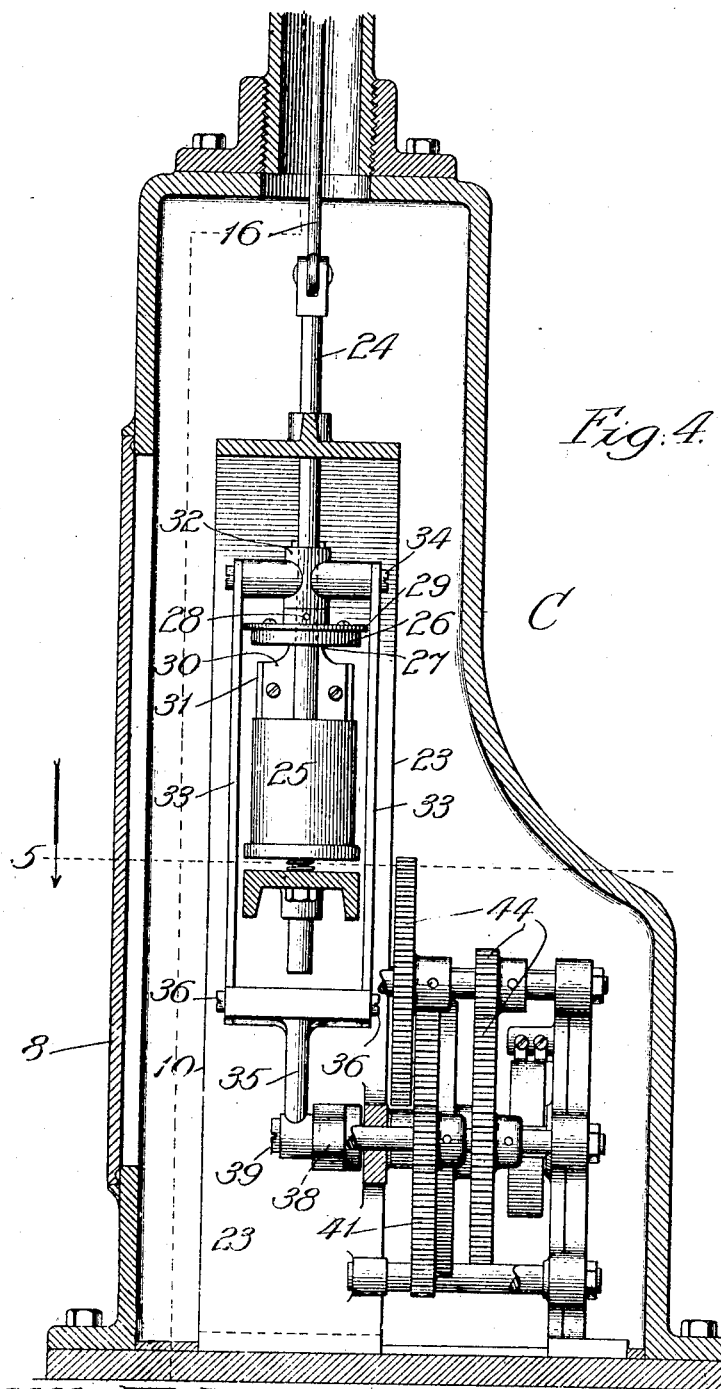

Figure 1 represents a diagrammatic view of a portion of a railway track equipped with our improved alarm signal and train-controlling mechanism; Fig. 2, an end elevational view of an engine or motor-car equipped with mechanism coöperating with the mechanism shown in Fig. 1 and serving to automatically control the train; Fig. 3, a broken sectional view taken as indicated at line 3 of Fig. 4 and showing mechanism for automatically restoring the movable stop, which is located at the side of the track and which is shown in Fig. 2 in a horizontal position, to its normally standing position; Fig. 4, a section taken as indicated at line 4 of Fig. 3; Fig. 5, a plan section taken as indicated at line 5 of Fig. 4; Fig. 6, a broken section taken as indicated at line 6 of Fig. 7 and showing the means located at the top of the pole or standard shown in Fig. 2, which serves in the actuation of the movable stop mentioned; Fig. 7, a broken section taken as indicated at line 7 of Fig. 6; Fig. 8, a broken side elevational view of the construction shown in Figs. 6 and 7, the operative position of the movable stop mentioned being shown in full lines and the inoperative, or normal standing position, being shown in dotted lines; Fig. 9, a broken sectional view taken as indicated at line 9 of Fig. 8; Fig. 10, a plan view of the mechanism shown in Fig. 9; Fig. 11, an enlarged broken view showing the manner of supporting the rock-shaft illustrated in Fig. 2 at the central portion thereof and means for shifting the rock-shaft longitudinally; Fig. 12, a broken section taken as indicated at line 12 of Fig. 11; Fig. 13, a broken view on an enlarged scale, showing the automatically opened air-relief valve shown in Fig. 2; Fig. 14, a broken section taken parallel with the view shown in Fig. 2 and exposing the spring contained in the casing shown at the right-hand upper portion of the engine shown in Fig. 2, said spring serving to restore said rock-shaft to its normal position after the rock-shaft has been automatically actuated to open said relief-valve; Fig. 15, a diagrammatic view illustrating the circuit of the electric motor which serves to restore the movable stop mentioned to its normal standing position, and illustrating, also, the means for controlling the motor circuit; and Fig. 16, a broken vertical sectional view illustrating a portion of the torpedo-placing mechanism described and claimed in said application No. 379,791.

It may be preliminarily stated that in the diagram illustrated in Fig. 1, the rotary torpedo-carrier employed is represented as controlled by an electric circuit which is controlled by a branch circuit connected with the switch-point of a railway track, and is further controlled by two electric circuits connected with two insulated sections of a railway track; and the torpedo - placing mechanism is represented as controlling the movable member or stop which is located at the side of the railway track and which serves to engage an arm mounted on the rock-shaft carried by the engine, thereby to open the relief-valve through the medium of said rock-shaft. The torpedo-placing device is arranged to operate to place a torpedo beneath a train approaching the switch-point in the event that the branch circuit mentioned is interrupted at the switch-point, and the torpedo-placing device will not operate to place a torpedo beneath a train passing in the opposite direction, that is, away from the switch-point, unless the electric circuit connected with the intermediate insulated track-section, shown in Fig. 1, is broken, as has been clearly described in said application No. 379,791. In the operation of placing a torpedo upon the track, when the controlling circuit of the torpedo-placing mechanism is broken, as happens when a train approaches the open switch, the torpedo-placing mechanism operates to thrust one of the radially movable torpedo holders outwardly and thereby locate a torpedo above the adjacent track-rail, and when the controlling circuit is restored, the mechanism operates to withdraw the projected torpedo-holder, as described in said application.

In the present invention, there is employed an electric circuit controlled by the means which serves to eject the torpedo, said circuit being broken when the torpedo is ejected. Said last-named circuit controls the movable local stop which has been mentioned above as serving to operate the rock-shaft carried by the engine. When said last-named circuit is broken, during the ejection of the torpedo, it operates to permit said movable stop to drop from its normal standing position shown in dotted lines in Fig. 8, to its horizontal position shown in full-lines in Figs. 2 and 8, so as to be in position to engage the co-operating mechanism of the engine.

In the preferred construction of the present invention, which is that illustrated, A represents a railway track electrically divided into sections $A^1$, $A^2$, $A^3$, the section $A^1$ having connected therewith a side-track $A^4$ and a switch-point $A^5$ operated by any convenient means (not shown); B, torpedo-placing mechanism controlled by a circuit $B^1$ having a branch $B^2$ adapted to be broken when the switch-point $A^5$ is open to admit a train to the side-track, and having a branch $B^3$ controlled by circuits connected with the track; $B^4$, an electric circuit connected with the track-section $A^3$ and controlling the branch $B^3$ of the circuit $B^1$; and $B^5$, an electric circuit connected with the track-section $A^2$ and serving, in connection with the circuit $B^4$, to control the branch $B^3$ of the circuit $B^1$. It may be stated here that the circuits $B^4$ and $B^5$ control the branch circuit $B^3$, according to the track condition, through the medium of mechanism $B^6$, as described in said application No. 379,791. It is sufficient to state here that the circuit $B^4$ has in it a magnet whose armature controls a circuit-breaker with which the circuit $B^1$ is equipped, and the circuit $B^5$ has in it a magnet which has two armatures, one of which serves as a lock for said first-named armature, and the other of which serves as a lock for its companion armature. Also, the circuit $B^5$ is provided at different points with batteries or generators, one of which is adapted to be short-circuited by a train, thereby partially deënergizing the magnet in the circuit and permitting that armature of said magnet which is most easily released to fall back into position to lock the armature of the magnet in the circuit $B^4$, while it is itself sustained by its companion locking-armature. The mechanism $B^6$ is fully described and claimed in Letters Patent No. 858,591, granted to E. E. Flora July 2, 1907. The circuit $B^1$ has therein a magnet $B^7$ whose armature $B^8$ controls a circuit $B^9$, which, when broken, permits the torpedo-placing mechanism B, which is partially illustrated in Fig. 16 and fully described in said application No. 379,791, to operate. The torpedo-placing mechanism B has connected therewith a normally closed electric circuit $B^{10}$, which serves to control local mechanism C located by the side of the railway track, which is provided with a movable stop $C^1$, which, in turn, serves to actuate relief-valve operating mechanism D mounted on the engine or motor-car $D^1$. The mechanism D operates, in emergency, to vent the train-pipe and apply the brakes. As will be clearly understood from said application No. 379,791, the torpedo-placing mechanism B is equipped, as illustrated in Fig. 16 of the accompanying drawings, with a rotary carrier 1 equipped with radially movable torpedo-holders 2 adapted to be projected by a rock-arm 3 mounted on a shaft 4, which is actuated by the weight 5. When the weight 5 moves in the direction indicated by the arrow in Fig. 16, the torpedo-holder will be projected. As appears from Fig. 16, the circuit $B^{10}$ is provided with a stationary contact member 6 and a movable contact member 7, which are normally held together by the weight 5, which normally occupies the position shown in Fig. 16. When the circuit $B^1$ is completely broken, as happens when the branch circuits $B^2$ and $B^3$ are broken, the circuit $B^9$ will be broken, and the torpedo-placing mechanism allowed to operate to project a torpedo, the movement of the weight 5 then permitting the contact 7 to leave the contact 6, thereby opening the circuit $B^{10}$. When the circuit $B^{10}$ is broken, the mechanism C is permitted to act to allow the stop $C^1$ to drop from the vertical position shown in Fig. 15 to the horizontal position shown in Fig. 2.

The mechanism C preferably comprises a casing 8; a standard 9 rising therefrom and supporting the movable stop $C^1$; and mechanism 10 serving to operate the movable stop.

As shown in Figs. 6 to 10 inclusive, the standard 9 is of tubular construction, and is surmounted by a chamber 11 in which is journaled a rock-shaft 12 equipped with a sprocket-wheel 13. About the sprocket-wheel passes a sprocket-chain 14 whose ends pass over grooved rollers 15 and depend into the tubular standard, where one end is connected with an actuating rod 16 and the other end with a weight 17. The stop $C^1$ comprises a U-shaped member, which may be formed of a heavy rod, as shown in Fig. 10. The end portions of the member $C^1$ are connected with castings 18 rigidly secured to the extremities of the shaft 12. The castings 18 are provided with arms 19 having weighted ends 20, which are connected by a cross-rod 21, the weighted ends of said arms being adapted to engage a buffer, or stop, 22 carried by the standard 9, as shown in Fig. 6. Thus, the stop 22 limits the downward swing of the stop-arm $C^1$. As has been indicated, the normal position of the arm $C^1$ is shown in Fig. 15, in which position it is held, against the tendency of the weights 20 to throw it to the horizontal position, by the mechanism 10. When the circuit $B^{10}$ is interrupted, the mechanism 10 permits the arm $C^1$ to drop to the horizontal position under the action of the weights 20, and when the circuit $B^{10}$ is restored to a closed condition, the mechanism 10 operates to restore the arm $C^1$ to a standing, or inoperative, position.

The mechanism 10 will be understood by reference to Figs. 3, 4 and 5. It comprises a frame 23 located within the casing 8; a vertically movable rod, or plunger, 24 extending through a suitable guide in the upper portion of the frame 23 and having its upper end pivotally connected with the lower end of the rod 16; an annular electro-magnet 25 through which the lower end of the rod, or plunger, extends; an armature 26 for said magnet, which is seated on a shoulder 27 with which the rod 24 is provided, and which is secured to the rod 24 by a pin 28; an electric-contact member 29 carried by the armature 26; a pair of yielding contact-members 30 co-acting with the contact-member 29 and mounted on insulating blocks 31 carried by the frame 23; a cross-head 32 located above the armature 26 and slidable on the plunger 24; links 33 joined at their upper ends by pivots 34 with the lugs of the cross-head 32; a connecting-rod 35 having an enlarged end connected by pivots 36 with the lower ends of the links 33; a shaft 37 journaled in the frame 23 near the base thereof and equipped with a crank 38 connected by a wrist-pin 39 with the lower end of the connecting-rod 35; a ratchet-wheel 40 rigidly connected with and serving to actuate the shaft 37; a gear-wheel 41 journaled on the shaft 37 and having a lateral chamber 42 within which is located the ratchet-wheel 40 and within which is also pivoted a pawl 43 carried by the gear 41 and co-acting with the ratchet-wheel 40; and a gear-train 44 serving to actuate the gear 41, and, in turn, actuated by an electric motor 45.

The details of construction of the mechanism 10 may be varied, and a more detailed description of said mechanism is unnecessary. The diagrammatic view shown in Fig. 15 will give a ready understanding of the manner in which the plunger 24 is held normally in a depressed position and the stop-arm $C^1$ thereby held in a vertical position while the electric circuit $B^{10}$ remains closed; and will also give an understanding of the manner in which the circuit of the motor 45 is controlled. The circuit $B^{10}$ has therein an electro-magnet 46 which controls a circuit-breaker 47 in an electric circuit 48, which normally energizes the magnet 25, thereby normally holding the armature 26 in a depressed position, and, through the medium of said armature 26, holding the plunger 24 in its lowermost position, thus preventing the stop-arm $C^1$ from falling to the horizontal position. The motor 45 has a circuit 49 which connects with brushes 50 and 51 which normally rest, side by side, upon an insulating strip 52 of a rotary contact-member, or metallic cylinder, 53 actuated by the gear 41. A conductor 54 connects one of the contact-members 30 with one side of the motor circuit 49, and a conductor 55 connects the other contact-member 30 with the armature 47. Connected with the other side of the motor circuit 49 is a conductor 56 which has a contact 57 normally in engagement with the armature 47. When the magnet 46 is deënergized, thereby interrupting the circuit 48 of the magnet 25, the armature 26 will be permitted to rise under the action of the weights 20 which throw the stop-arm $C^1$ to a horizontal position. This action is permitted by reason of the fact that the gear-wheel 41 stands normally in the position shown in Fig. 15, so that the cross-head 32 normally occupies the elevated position shown in Fig. 15. When the armature 26 is raised to the upper end of its traverse, as happens when the plunger 24 is elevated during the drop of the stop-arm $C^1$, the contact-member 29 enters between the contact-members 30 and closes the circuit of the conductors 54 and 55 at that point. When the circuit $B^{10}$ is reëstablished, the armature 47 is restored to the position shown in Fig. 15, and the motor circuit 49 is then completed through the conductors 54, 55 and 56. Thus the motor is set in operation, and before the contact-member 29 is depressed sufficiently to leave the contact-members 30, the motor circuit is established through the brushes 50 and 51 and the rotary contact-member 53. The motor then continues to operate until the gear 41 completes its revolution, thereby bringing the armature 26 again into contact with the magnet 25 and lifting the stop-arm $C^1$ to the standing position.

The train-carried, or transient, mechanism

D which coöperates with the local movable stop $C^1$, is illustrated in Figs. 2, 11, 12, 13 and 14. This mechanism comprises preferably a longitudinally shiftable, transversely extending rock-shaft 58 equipped at its ends with arms 59 adapted to be engaged by the local stop-arms $C^1$; bearings 60 supported by the engine $D^1$ and through which the end portions of the shaft 58 extend; a sleeve, or tubular shaft, 61 provided with a longitudinal slot 62 engaged by a lug, or stud, 63 with which the shaft 58 is equipped (Fig. 14); springs 64 within the bearings 60 and which serve to restore the rock-shaft 58 and sleeve 61 to their normal position, after the rock-shaft has been actuated through the medium of the arms $C^1$ and 59; a central hanger 65 through which the shaft 58 extends; a tubular keeper 66 through which the shaft 58 extends and which is connected with the hanger 65 in any suitable manner to give rigidity to the keeper 66, said keeper being provided with a longitudinal slot 67 whose ends are intersected by circumferential slots 68, 69; a shaft-shifting lever 70 rigidly connected with the shaft 58, and located normally in either the slot 68 or the slot 69, according to which of the arms 59 on the rock-shaft 58 it is desired to employ in connection with the stop-arms $C^1$ located along the railway track (this depending upon the direction of movement of the train in a single track system); an arm 71 rigidly connected with the tubular shaft 61 and having connected therewith a link 72 provided with a slot 73; and a relief-valve 74 having an actuating arm 75 equipped with a stud 76 engaging with the slot 73. The relief-valve 74 is connected with the relief-pipe 77 which controls the brakes. As shown, the pipe 77 has a branch 78 controlled by a manually operated valve 79, and a branch 80 with which the automatically actuated relief-valve 74 is connected. The branch-pipe 80 is equipped with a whistle 81. The actuating arm 75 of the relief-valve 74 is equipped with a spring-held pawl 82 adapted to engage a notch 83 with which the casing of the valve is equipped. When the arm 75 is lifted in the direction indicated by the arrow in Fig. 13, the pawl 82 engages the notch 83, thereby locking the relief-valve in the open position. The pawl 82 is equipped with a knob 84, by means of which the pawl 82 may be released from the shoulder 83, thereby permitting the valve 74 to be closed. The valve 74 is so located that it will be necessary, in the event that the valve is automatically opened, for the engineer to leave his seat in the cab in order to close the valve and regain control of the train.

In practice, the mechanism C is located between the torpedo-placing mechanism B and the switch-point, or the point to be protected, the torpedo-placing mechanism being sufficiently distant from the mechanism C to allow the engineer time to arrange to bring his train to a stop under control. In the event the engineer disregards the torpedo signal, the train will be automatically brought to a stop when the mechanism C is encountered.

The operation may be briefly summarized thus: When a train approaches the open switch, the branch circuit $B^3$ will be broken, and the branch circuit $B^2$ being also open, the magnet $B^7$ will be deënergized, thereby breaking the circuit $B^9$ and permitting the torpedo-placing mechanism B to operate to project a torpedo. When the torpedo-placing mechanism operates, it breaks the circuit $B^{10}$, thereby permitting the armature 47 to move and break the circuit 48 of the magnet 25. When the magnet 25 is deënergized, the stop-arm $C^1$ is permitted to fall to the horizontal position. Assuming the rock-shaft 58 of the mechanism D to be shifted to the right position for the direction of train movement, the arm 59 on said rock-shaft will encounter the arm $C^1$, and the rock-shaft 58 and sleeve 61 will be rotated, thereby opening the relief-valve 74. The operation just described assumes that the engineer failed to heed the warning given by the torpedo. In case the engineer heeds the warning given by the torpedo, he may either bring his train to a stop before the local mechanism C is encountered; or, he may shift the shaft 58 so that its actuating-arm 59 will not encounter the stop $C^1$ in which case the brakes will be operated under control; or, he may permit the automatic action of the relief-valve to occur and stand ready to take immediate control of the train by releasing the pawl 82 and closing the valve 74. After the stop $C^1$ has been dropped to the horizontal position, it will remain in that position until the circuit $B^{10}$ is reëstablished, whereupon the electric motor will operate, in the manner described above, to lower the cross-head 32 and thereby draw down the armature 26 and plunger 24. When the armature 26 is brought again within the range of the magnet 25, it will be held in that position until the circuit 48 is again broken as a result of the breaking of the circuit $B^{10}$.

It is noteworthy that by combining the torpedo-placing mechanism B with the train-stopping mechanism, the engineer is enabled to bring his train gradually to a stop, or to proceed cautiously, thereby avoiding injury to the train, saving time, and enabling the most economical train-operation to be carried out.

The arm $C^1$ carries a shield or blind 84, which serves, when the arm $C^1$ is in its inoperative position, to cover a lamp 85 which surmounts the post 9. When the arm $C^1$ drops to the operative position, the danger light is offered to view.

The foregoing detailed description has been given for clearness of understanding only, and no undue limitation is to be understood therefrom.

What we regard as new, and desire to secure by Letters Patent, is—

1. The combination with a track, of torpedo-placing mechanism located adjacent to the track at a given point, and train-controlling mechanism located at the track some distance in advance of and protected by said torpedo-placing mechanism.

2. The combination with a track, of train-controlling mechanism located at the side of the track some distance in advance of a point to be protected, and torpedo-placing mechanism connected with the track some distance in advance of the train-controlling mechanism and serving to control the train-controlling mechanism.

3. The combination with a track, of electrically-controlled torpedo-placing mechanism connected with the track, and train-controlling mechanism electrically-controlled by said torpedo-placing mechanism.

4. The combination with a railway track, of local train-controlling mechanism comprising a movable stop-arm normally located in the inoperative position, means tending normally to throw said stop-arm to the operative position, and electro-magnetic means normally holding said stop-arm in its inoperative position.

5. The combination with a railway track, of a movable stop-arm, means for controlling the position of said stop-arm, and train-carried valve-controlling mechanism, comprising a shiftable rock-shaft equipped with an actuating arm, and valve-actuating means connected with said rock-shaft.

6. The combination with a railway track, of local train-controlling mechanism comprising a movable stop-arm, means for controlling the position of said stop-arm, train-carried mechanism comprising a relief-valve equipped with an actuating-arm, a rock-shaft equipped with an arm having lost-motion connection with the actuating-arm of said valve, and an arm carried by said rock-shaft adapted to be engaged by said stop-arm of the local mechanism.

7. In train-carried train-controlling mechanism, the combination with a valve, of a transversely extending longitudinally shiftable rock-shaft connected with said valve, means for shifting said rock-shaft, and actuating-arms connected with the extremities of said rock-shaft.

8. In train-carried train-controlling mechanism, the combination with a relief-valve, of a tubular rock-shaft connected with said valve, a longitudinally shiftable rock-shaft extending through said tubular shaft and having sliding connection therewith, whereby said shafts will turn together, an actuating-arm connected with said second-named shaft, and a spring serving to restore said shafts to their normal position.

9. In train-carried train-controlling mechanism, the combination of a longitudinally shiftable transversely extending rock-shaft, a keeper through which said rock-shaft extends, a shifting-arm connected with said rock-shaft and co-acting with said keeper, a relief-valve connected with said rock-shaft, an actuating-arm for the rock-shaft, and a spring tending to restore the rock-shaft to its normal position after it has been automatically actuated.

10. The combination with a railway track, of local train-controlling mechanism, comprising a standard, a rock-shaft journaled therein and equipped with a normally standing stop-arm, a weighted arm connected with said rock-shaft and tending to throw said first-named arm to the operative position, and means for restoring said stop-arm to the standing position.

11. In local train-controlling mechanism, the combination of a movable stop-arm, means tending to throw said stop arm to the operative position, a plunger through the medium of which said stop-arm may be restored to its inoperative position, an electro-magnet having an armature movable on said plunger, an electric motor, circuits for said magnet and motor controlled by said armature, and gear mechanism actuated by the motor and serving to depress said plunger and said armature to bring the armature again within the range of said magnet.

12. In local train-controlling mechanism, the combination of a movable stop-arm, means tending to throw said stop-arm to the operative position, a plunger serving to restore said stop-arm to the inoperative position, an electro-magnet having an armature movable with relation to said plunger, a cross-head movably connected with said plunger, an electric motor, gear mechanism connected with the electric motor and with said cross-head, circuits for said magnet and motor controlled by said armature, and controlling mechanism for the motor circuit controlled by said gear mechanism.

13. In train-controlling mechanism, the combination with a standard, of a lamp carried thereby, a stop-arm pivoted on said standard, means for actuating said stop-arm, and a lamp-blind carried by said stop-arm.

ELLSWORTH E. FLORA.
ROBERT J. ZORGE.

In presence of—
RALPH SCHAEFER,
L. KIRKLAND.